Oct. 31, 1939.                W. H. CAHALL                2,177,864
                       SEMICARRIER LAND LEVELER
                       Filed April 12, 1938         2 Sheets-Sheet 1
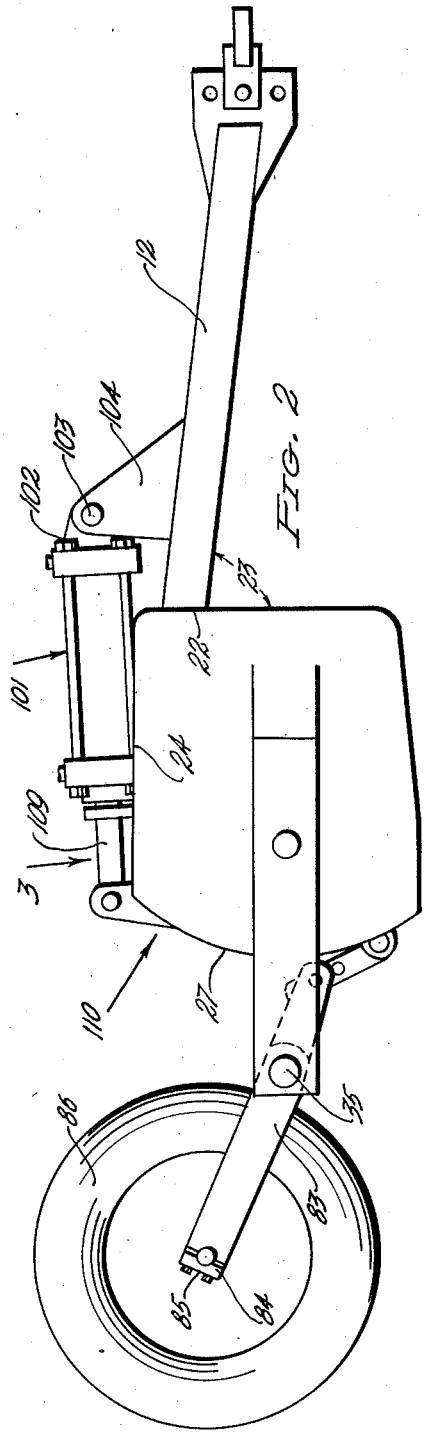
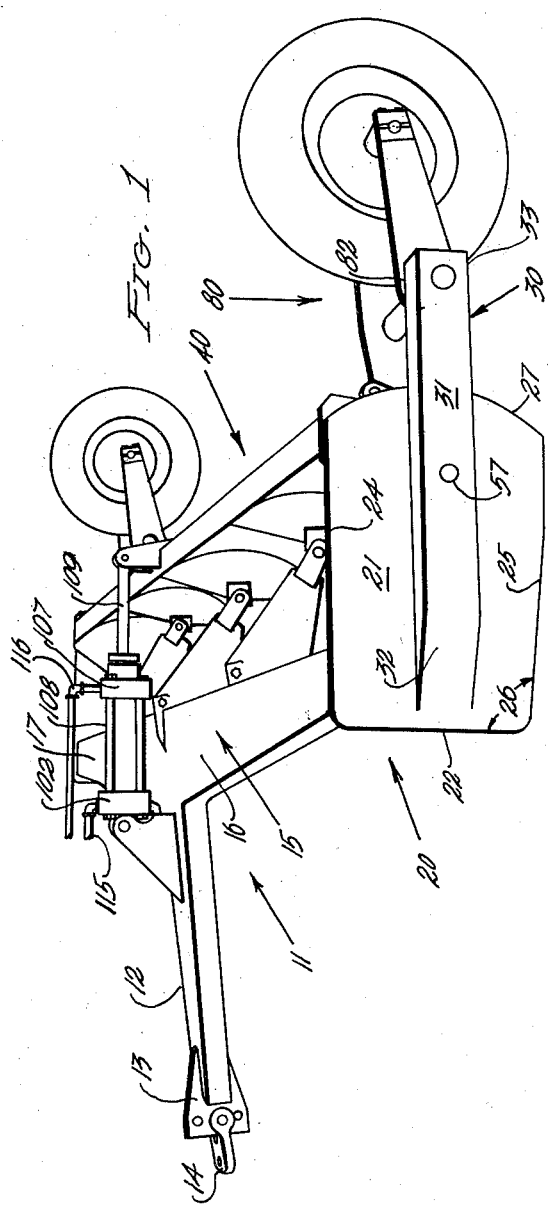
Inventor
WILLIAM H. CAHALL
By Hazard and Miller
Attorneys Oct. 31, 1939.  W. H. CAHALL  2,177,864
SEMICARRIER LAND LEVELER
Filed April 12, 1938  2 Sheets-Sheet 2
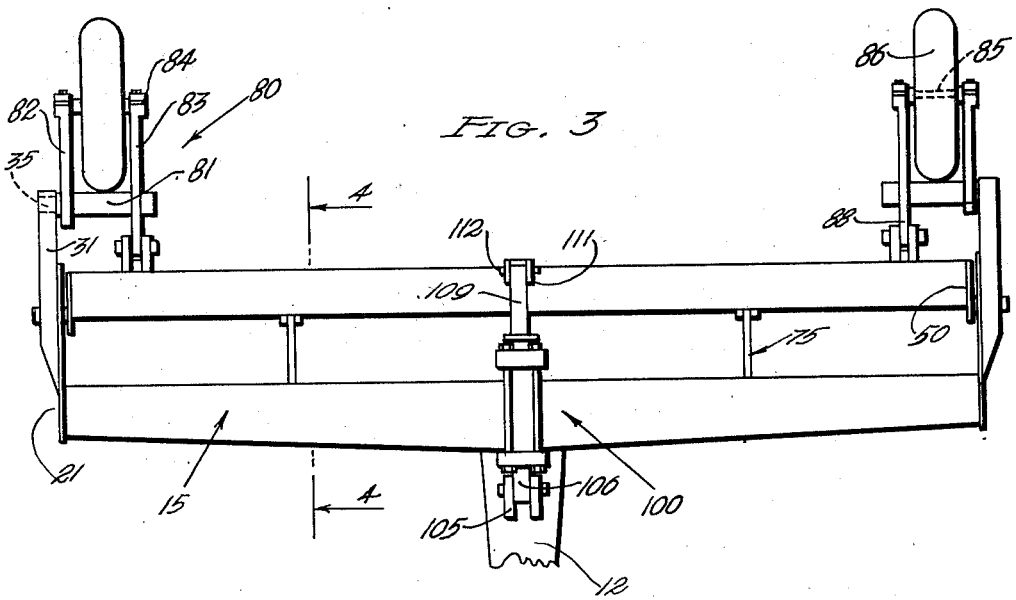
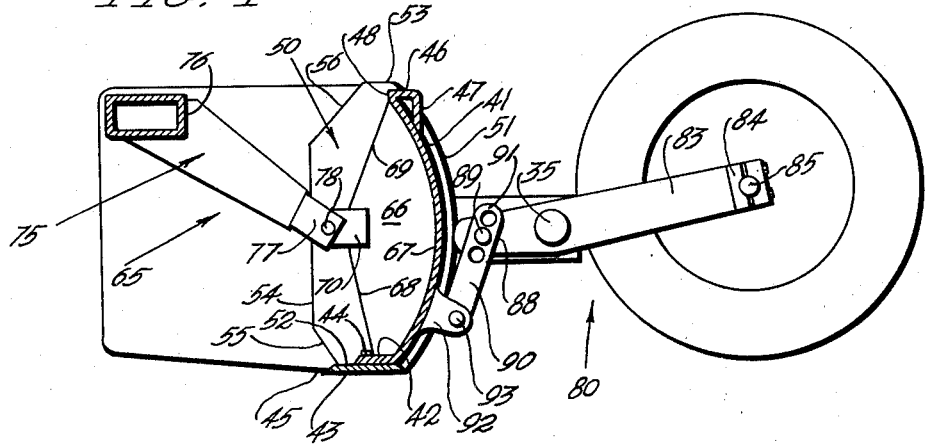
Inventor
WILLIAM H. CAHALL
By Hazard and Miller
Attorneys Patented Oct. 31, 1939

2,177,864

UNITED STATES PATENT OFFICE 2,177,864

SEMICARRIER LAND LEVELER

William H. Cahall, South Gate, Calif., assignor to National Tank and Manufacturing Company, Los Angeles, Calif., a corporation of California Application April 12, 1938, Serial No. 201,567

19 Claims. (Cl. 37—169)

My invention relates to a class of dirt moving machines known in the trade as land levelers in that they are mainly employed either to level the ground or to build up embankments, earth dams or the like or make large fills. This type of machine is usually towed by a tractor and is provided with wheels through the medium of which and a connection to the tractor, the tilt of the bowl may be varied, the wheels also having the function of supporting the equipment when returning after discharging or spreading a load.

It is well known that in some types of earth leveling and dirt moving that the ordinary type of drag scraper has a number of advantages, certain of these have to do with the comparative lightness and the ability to follow more or less the contour of the ground without losing the load. In this type the load to a certain extent is pushed over the surface of the ground. Where the load must be lifted completely clear of the ground for transfer from one place to another, it is necessary to make the equipment ever so much stronger and thus heavier than for the drag type of scrapers and earth movers. As both of these type usually pick up their load from soft ground or hard ground loosened by scarifiers, plows or other suitable means, it is necessary that when loaded, that the material be carried or transferred without picking up additional load or dropping a material amount of the load in the transferring. An object therefore of my invention is a wheeled type of land leveler embodying some of the advantages of the drag scraper and the earth carrying type with provision that in the transfer of the earth the action is somewhat after the manner of the drag scraper. My invention also includes a hydraulic actuating means with the controls on the tractor so that the operator may position the wheels and the bowl together with the cutting blade of the bowl as desired or necessary for the purpose of cutting the earth to provide the load and then transfer this in the manner of a drag scraper with the wheels elevated. Then by engaging the wheels with the ground and at the same time raising and tilting the bowl, the load may be spread, dumped and leveled.

Another differentiating characteristic of my invention over the prior type of scrapers or land levelers is that in a number of the prior type the header or confining plates are attached to the opposite ends of the bowl and in pivoting the bowl these plates also pivot. In some constructions the hinge or pivot for the bowl and the header plates is closely contiguous to the bowl, in other cases the pivot is forward of the bowl, therefore by this prior construction the amount of the earth that can be moved, that is by being pushed ahead of the bowl is limited in part by the size of the confining or header plates.

A main characteristic of my invention resides in providing header or confining plates which are rigidly connected to the frame structure of the machine, that is, to the tow bar and the tow beam and thus held in the same relationship to the towing tractor. The bowl is mounted to tilt or hinge on a pivot center through the two header or confining plates. As the bowl is somewhat concave shape as to its forward surface, end plates are secured to the bowl and these are pivoted to the confining plates, therefore no matter what the tilt be of the bowl and the relative position of the wheels, the two side confining plates extend considerably forward of the bowl and therefore in the earth moving position of the assembly, allow piling of the load a considerable distance forward of the bowl and this not being limited by the end plates directly attached to the bowl for the purpose of the pivotal mounting.

Another characteristic of my invention is the pivotal connection of the wheels to the stationary frame structure, that is, to the assembly having the confining or header plates rigidly attached to the tow beam and tow bar. This pivotal connection includes a trailing pivotal support for the wheel axles, the pivot being preferably connected to side beams with a sleeve or yoke connection having a sleeve pivoting on the pin with trailing arms to the axle. With this I interconnect the yoke or arm structure for the wheel mounting with the bowl so that any tilting of the bowl is immediately communicated to the yoke arms for the wheels to raise and lower these in reference to the fixed structure including the header or confining plates and the tow bar assembly. Such pivotal connection gives a quick action of the movement of the wheels and by small adjustments the angle of the cutting blade to the ground line may be readily changed in accordance with the cut to be made and the transport removing the material and then by contacting the wheels with the ground, the spreading may be regulated.

A further characteristic of my invention is providing a hydraulic control connection from the stationary frame structure including the tow bar and side plate assembly to the bowl for actuation by the driver of the tractor and thus at the same time control the positions of the wheel assemblies.

My invention is illustrated in connection with the accompanying drawings, in which:

Fig. 1 is a perspective view of my invention, the wheels being shown as elevated and the blade attached to the bowl in an earth cutting or removing position.

Fig. 2 is a side elevation partly broken away showing the assembly substantially in the position of Fig. 1.

Fig. 3 is a plan with certain parts removed taken in the direction of the arrow 3 of Fig. 2.

Fig. 4 is a vertical longitudinal section on the line 4—4 of Fig. 3 in the direction of the arrows.

In my invention I use a rigid tow bar and tow beam designated by the assembly numeral 11. This has a tow bar structure 12 preferably made of plates assembled and welded to form a hollow taper tow bar. At the forward end this has a vertical adjusting plate 13 with perforations and a clevis 14 for attachment to a tractor and in this type of work it is usual to use endless track type of tractors with a fixed connection to the frame for attachment of earth levelers or other implements. The tow beam 15 is formed integral with the tow bar. This is also preferably made of a hollow metal construction substantially rectangular at any longitudinal section, the various plates being welded together. This tapers in its longitudinal measurement from the center portion 16 to the outer ends 17.

The side or earth confining plates designated by the assembly 20 each have a metal plate 21 having a front edge 22 which forms an acute angle indicated at 23 with the line of the tow bar 12. The upper edge 24 is substantially at right angles to the edge 22, the lower edge 25 however is not exactly parallel to the upper edge 24, the angle 26 being slightly greater than a right angle. The rear edge 27 is convex. Secured to the outside of each of the plates 21 there is a side beam assembly 30. This has a hollow beam structure indicated at 31 formed by plates bent and welded together and having a tapered connection 32 to the forward portion of the plates 21 adjacent the end 22. These beams are the same on both sides and extend outwardly from the side plates 21. Rigidly connected in a substantial manner to the rear end 33 of the side plate assemblies there is a wheel assembly pivot pin 35. This pin is thus rigidly connected to the side plates 21 through the medium of the beam assembly and thus rigidly connected to the tow bar and tow beam assembly as the ends 17 of the tow beam are rigidly connected to the side plates 21 either by bolting, welding or the like.

The bowl assembly designated by the numeral 40 include the bowl plate 41 which has a concave curve on the forward side, this being substantially a segment of a circle. At its lower edge there is a longitudinal flange 42 to which the cutting blade 43 is connected thereto preferably by bolts 44. This blade has double bevel edges 45 permitting reversal of the blade. The upper portion of the bowl has a rearwardly turned flange 46 with an apron plate 47 on the back welded or otherwise secured to the back of the bowl. Thus the upper edge of the bowl has a slightly rounded forward edge 48.

The bowl assembly also includes end plates 50, there being one plate on each end and welded to the bowl, the rear edge 51 preferably projects slightly back of the bowl. The lower portion 52 is in substantial alignment with the bottom of the blade 43, the upper edge 53 is positioned slightly above the top of the flange 46 and the forward portion 54 extends well forward from the bowl, there being beveled edges 55 and 56 to provide a substantial plate at each end to receive the main pivot stub shafts 57 which extend through the end plates 21 and the beam structure 31. The bowl is therefore free to tilt on these stub axles.

Additional bracing and pivotal mounting for the bowl indicated by the assembly numeral 65 includes a series of web plates 66 each having a convex edge 67 fitting inside the concave curvature of the bowl and welded thereto. Each of these plates has a forward edge 68 extending to the flange 42 and an edge 69 extending upwardly to the upper curved nose portion 48 of the bowl. Connected to each of these plates there is a forwardly extending journal plate 70. Cooperating therewith there are also a series of diagonal brace plates 75, each of which is rigidly secured by having a cut-out portion 76 to the hollow tow beam 15. A pair of parallel strap ends 77 overlap the plates 70 and these are connected by axle pins 78. The axle pins 78 are in direct alignment with the stub axles 57. This gives a substantial support for the bowl between the tow beam 15 and the side plates 21.

The wheel yoke designated 80 includes for each wheel a sleeve 81 rotatable on the pivot pin 35, a single lever arm 82 and a double lever arm 83, both rigidly attached to the sleeve. Each lever arm has a clamp 84 at its outer end for the wheel axle 85 of the wheel 86. The forward end 88 of the double lever has a detachable connection by means of an attaching bolt 89 to a swivel link 90 which link is provided with a series of adjusting perforations 91. The lower end of such link is attached to the back of the bowl by a fin plate 92 and a bolt 93. By this construction the wheel yoke 80 with the single and double levers turns in a vertical arc on the pivot pin 35. The wheels thus trail behind the bowl and through the medium of the link 90 due to the tilt of the bowl and the action of the double lever, may have the wheeled tires or treads contact the ground or be raised above the ground.

The control equipment for the tilt of the bowl and the action of the wheels is through the medium of the tilting assembly 100. This includes a power cylinder 101 having a fixed head construction 102 with a pivot pin 103 connecting to a substantial bracket 104 extending upwardly from the tow bar 12. This bracket is illustrated as having a pair of parallel ears 105 with the pivot pin 103 extending through these ears and a tongue 106 connected to the head 102. The forward head 107 of the cylinder is connected to the base head by tie-bolts 108 or the like. The piston rod 109 extends outwardly through suitable packing glands in the head 107 and has a pivotal connection to a bowl bracket assembly 110. This is illustrated as having a pair of parallel plates 111 welded or otherwise secured to the back of the bowl at its center considered between the ends and having a pivot pin 112 attaching the forward end of the piston rod to the bracket 110. The power connection includes a supply pipe 115 connected to the head 102 of the cylinder and a second supply pipe 116 connected to the head 107. These have suitable couplings and connectors providing for a flexible hose connection to the tractor, the tractor being always held a fixed distance from the bowl assembly by the tow bar 12 and the clevis connection 14.

The operation and functional characteristics of my invention are substantially as follows: a characteristic of the invention is the rigid assembly of the frame which includes the tow bar and tow beam assembly 11, the confining plates 21, sometimes designated in the trade "header plates" and it is to these confining or header plates that the bowl is pivoted by the horizontal pivot on the stub shafts 57. On account of the bowl being concave on the front face the end plates 50 on each end of the bowl form the means for pivoting the bowl. Incidentally where the bowl is quite short, the intermediate pivots with the aligned axle pins 78 may be omitted, thus omitting the diagonal brace plates 57 and the web plates 66, however for a bowl of considerable length and to move a heavy load, it is advisable to have this additional bracing.

Manifestly the wheel yokes 80 operate simultaneously and due to the pivotal connection to the bowl when the hydraulic cylinder 101 is operated, the bowl is tilted on its horizontal axle or hinge 57 in reference to the rigid frame structure including the confining or header plates 21, hence the wheel yokes are simultaneously moved up or down and when inclined downwardly raise the entire bowl and the header plates from the ground but when the wheels are raised for instance in the position shown in Figs. 2 and 4, the blade is in a horizontal or approximately horizontal position for cutting dirt from the ground surface or for transporting the load.

A manifest advantage of having these relatively large confining or header plates 21 is that the earth confined by and filling the bowl may pile forwardly to the limit of the header plates and then at the center bulk forward of these plates. It will be noted that the end plates 50 of the bowl are quite close to the inside of the confining plates 21 so that the possible loss of material at the ends of the bowl is immaterial. In view of the fact that the machine when in the cutting and transporting of the load travels with the wheels elevated, it will be seen that the operator on the tractor may readily adjust the angle of the bowl and hence the position of the cutting blades in reference to the ground to cut or dig the load where desired, then tilt the bowl for proper sliding and hence shoving of the load over ground surface to the location for dumping and spreading the load. The thickness of the spread may readily be regulated by simultaneously tilting the bowl and at the same time transferring weight from the bowl to the wheels and lifting the blade to the proper height above the ground level. This not only dumps but spreads the load as required. A further action of tilting the bowl will depress the wheels still more in reference to the rigid carriage structure elevating the cutting blade of the bowl to a considerable height above the ground level for the return trip of the equipment or for transportation over a road.

While I have shown a distinct tow bar and tow beam assembly connected to the confining or header plates 21 and a side beam construction such as 31 extending rearwardly from these side plates, it is manifest that the construction may be materially modified and still employ the same features or principle of construction. It is also obvious that instead of using a pivoted wheel mounting that other mechanism may be interconnected with the bowl to raise and lower the wheel assemblies in relation to the tilt or position of the bowl and its cutting blade.

Various changes may be made in the details of the construction without departing from the spirit or scope of the invention as defined by the appended claims.

I claim:

1. A land leveler having in combination a tow bar, a tow bar beam, a side plate assembly with side beams all rigidly connected together, a bowl having a blade with a hinged connection to the side plates, wheel assemblies having a movable connection to the side beams, means interconnecting the tow bar and tow beam assembly and the bowl to rotate the bowl on its hinge and an interconnecting means between the bowl and the wheel assemblies to raise and lower the wheels in reference to the side beam assemblies.

2. A land leveler as claimed in claim 1, the wheel assemblies having a pivotal connection to the side beam assemblies, each wheel being provided with lever arms, the means to move the wheel assemblies causing a pivotal movement of the wheels on the pivot of the lever arms.

3. A land lever as claimed in claim 1, the tow beam having braces connected thereto and means forming a hinge for the bowl to the said braces, the said hinge being in alignment with the hinge connection of the bowl to the side plates.

4. A land leveler comprising in combination a tow bar with means for attachment to a tractor, a transverse tow beam extending therefrom, a pair of opposite confining plates attached to the ends of the tow beam, a side beam attached to each confining plate, the tow bar, tow beam, confining plate and side beam being rigidly connected, a bowl having a cutting blade having a hinged mounting in the confining plates, a wheel assembly adjustably mounted on each side beam, a control means interconnecting the rigid tow bar and tow beam and the bowl to tilt the bowl on its hinge and an interconnecting means between the bowl and the wheel assemblies to raise or lower the wheels in reference to the side beams on the rotating movement of the bowl.

5. A land leveler as claimed in claim 4, the mounting of each wheel assembly including a wheel assembly pivot pin rigidly connected to each side beam, a short lever and a double lever pivotally mounted on said pin and each having a clamp for the wheel axle, the interconnecting means from the bowl to the wheel assembly including a swivel link pivotally connecting the bowl and the double lever.

6. A land leveler as claimed in claim 4, a plurality of diagonal braces rigidly connected to the tow beam, a web plate for each brace and a hinged connection between each brace and its associated web plate, the said hinges being in alignment with the hinge of the bowl to the confining plates.

7. A land leveler comprising in combination a rigidly connected tow bar having means for attachment to a tractor, a tow beam extending in opposite directions from the rear end of the tow bar, a pair of vertical confining plates attached to the opposite ends of the tow beam, side beams secured to each confining plate and extending rearwardly thereof, each side beam having a pivot for a wheel assembly, each wheel assembly including a short lever and a double lever mounted on a wheel assembly pivot pin, the outer portions of the lever and double lever having clamps for the wheel axle, a bowl having a hinged connection by hinge pintles to the said confining plates, the pintles and the wheel assembly pivot pins being parallel, means to rotate the bowl on its hinge in reference to the tow bar, tow beam and confining plate and an interconnecting means between the bowl and each double lever to tilt or incline the double lever on rotational movement of the bowl and thus raise or lower the wheels in reference to the side beams.

8. A land leveler as claimed in claim 7, the means to rotate the bowl on its hinge comprising a power cylinder construction pivotally connected to the tow bar and tow beam structures and having a piston rod with a pivotal connection to the bowl.

9. A land leveler as claimed in claim 7, the interconnecting means between the bowl and each double lever including a link pivotally connected to the rear side of a bowl and an adjustable pivotal connection between the said link and the forward end of the adjacent double lever.

10. A land leveler comprising in combination a relatively rigid structure including a pair of vertical confining or header plates with means for spacing these apart parallel and providing a tow connection to a tractor, a bowl, a pivotal connection between the bowl and the confining plates providing a horizontal pivot, a wheel structure having a pair of wheel assemblies each with their yoke and lever arms with a pivotal attachment means to the confining plates, the pivotal connection of the yoke being parallel to the pivotal mounting of the bowl and the confining plates, an interlinking mechanism between the yoke and the bowl and means to tilt the bowl in reference to the rigid structure having the confining plates.

11. A land leveler as claimed in claim 10, the interconnection between the yoke and the bowl including an arm portion extending forwardly of the pivot forming the yoke mounting and a link pivotally connected to such forward extension and to the bowl.

12. A land leveler comprising in combination a rigid structure with a tow connection to a tractor and including a pair of vertical confining or header plates spaced apart and parallel, a bowl having a cutting blade, means pivotally connecting the bowl to the confining plates by a horizontal pivot, wheel assemblies each including a wheel pivot pin connected to the rigid structure rearwardly of the bowl and parallel to the bowl pivots, a yoke mounted on the wheel pivots and having a ground engaging wheel thereon, an arm extending forwardly from the yoke, a link connection between the bowl and the said forwardly extending arm and a control means interconnected by the rigid structure and the bowl to tilt the bowl and at the same time turn the yokes on their pivots and hence raise or lower the said wheels.

13. A land leveler as claimed in claim 12, the control means including a hydraulic cylinder pivotally connected to the rigid structure and having a piston rod, the said rod having a pivotal connection to the bowl.

14. A land leveler comprising in combination a relatively rigid structure including a pair of vertical confining or header plates spaced apart and parallel with a tow connection to a tractor, a bowl having a cutting blade adjustably connected to said confining or header plates and positioned therebetween, a structure having a wheel mounting operatively connected to the said confining or header plates and a control means having a connection between the rigid structure and the bowl and wheel mounting to simultaneously move the bowl as to its cutting and conveying position for dirt and the elevation of the wheels and the wheel assembly in regard to the confining or header plates.

15. A land leveler comprising in combination a relatively rigid structure including a pair of vertical confining or header plates spaced apart, said rigid structure having means for a tow connection to a tractor, wheel assemblies with a pivotal connecting means to the rigid structure, a bowl having a cutting blade pivotally connected to the header plates and a control means having a connection to the rigid structure to the wheel assemblies and the bowl to simultaneously tilt the blade and the bowl and raise or lower the wheel assemblies.

16. A land leveler comprising in combination a relatively rigid structure including a pair of vertical confining or header plates spaced apart and parallel, a bowl having a cutting blade pivotally connected to the confining or header plates, the rigid structure having a beam extending rearwardly on each side of said rigid structure, wheel assemblies on each side, each pivotally connected to the beam, a control means having a connection to the rigid structure and to the bowl, a connection from the bowl to the pivoted wheel assemblies whereby the control means simultaneously tilts the bowl with its blade and raises or lowers the wheel assemblies.

17. In a land leveler the combination of a relatively rigid structure including a pair of vertical confining or header plates spaced apart and parallel with a tow connection to a tractor, a bowl having a cutting blade, said bowl at each end being provided with end plates, a pivotal connection between the end plates of the bowl and the said confining plates, the bowl having a series of web plates, the rigid structure including a plurality of diagonal brace plates and a pivotal connection between the brace plates and the web plates in axial alignment with the pivotal connection of the end plates of the bowl and the confining plates and a control means interconnecting the rigid structure and the bowl for tilting the bowl and its blade in reference to the rigid structure.

18. A land leveler comprising in combination a relatively rigid structure having a towing means constructed and adapted for connection to a tractor, said rigid structure including a pair of vertical confining or header plates spaced apart and parallel with the axis of the tow connection, a bowl pivotally connected to and between said confining plates by a horizontal pivot, such bowl having a lower cutting edge, a wheel assembly, a movable connection between the wheel assembly and the rigid structure and an actuating connection between the rigid structure, the bowl and the wheel assembly whereby the bowl may be tilted on its pivot and the wheel assembly raised and lowered relative to the rigid structure.

19. A land leveler comprising in combination a relatively rigid structure including a pair of vertical confining or header plates spaced apart and parallel with a tow connection to a tractor, a bowl having a cutting blade adjustably connected to the confining or header plates and positioned therebetween, a wheel assembly including a first connection to the confining or header plates and a second connection to the bowl, an actuating means interconnected between a portion of the rigid structure and the bowl to move the bowl relative to the confining or header plates and by the interconnection of the bowl and the wheel assembly move the wheel assembly in reference to the bowl and the confining plates whereby the bowl may be moved up and down and the wheel assembly moved up and down relative to the rigid structure.

WILLIAM H. CAHALL.